(12) United States Patent
Shackleton

(10) Patent No.: US 8,409,011 B2
(45) Date of Patent: Apr. 2, 2013

(54) SYSTEM AND METHOD OF CONDUCTING SIMULATED COMBAT

(75) Inventor: David Shackleton, Newport Beach, CA (US)

(73) Assignee: David Shackleton, Newport Beach, CA (US)

( * ) Notice: Subject to any disclaimer, the term of this patent is extended or adjusted under 35 U.S.C. 154(b) by 198 days.

(21) Appl. No.: 12/694,016

(22) Filed: Jan. 26, 2010

(65) Prior Publication Data

US 2010/0197380 A1 Aug. 5, 2010

Related U.S. Application Data

(60) Provisional application No. 61/149,088, filed on Feb. 2, 2009.

(51) Int. Cl.
*A63F 13/10* (2006.01)

(52) U.S. Cl. ............................................. 463/42; 463/22

(58) Field of Classification Search .................... 463/42, 463/22
See application file for complete search history.

(56) References Cited

U.S. PATENT DOCUMENTS

| | | | |
|---|---|---|---|
| 6,334,614 B1 | 1/2002 | Breeding | |
| 6,485,367 B1 | 11/2002 | Joshi | |
| 6,666,765 B2 | 12/2003 | Vancura | |
| 2006/0038349 A1* | 2/2006 | Meeks | 273/308 |
| 2006/0046809 A1* | 3/2006 | Hiranoya et al. | 463/9 |
| 2007/0167203 A1* | 7/2007 | Yamada et al. | 463/7 |
| 2009/0005162 A1* | 1/2009 | Itoh | 463/31 |
| 2010/0240436 A1* | 9/2010 | Wilson et al. | 463/20 |

OTHER PUBLICATIONS

Obsidian Entertainment, Inc., Neverwinter Nights 2, http://www.replacementdocs.com.*
Black Isle Studios, Icewind Dale II, http://www.replacementdocs.com.*

* cited by examiner

*Primary Examiner* — Dmitry Suhol
*Assistant Examiner* — Jason Yen
(74) *Attorney, Agent, or Firm* — Novel IP

(57) ABSTRACT

The present invention is a system and method of simulated combat which can be incorporated in an online multiplayer game. The game, which can be played using multiple human players competing against each other or playing against a computer, begins with a randomly chosen player going first. The randomly chosen player makes one of four moves: Slash, Feint, Adjust, or Thrust. If the player chooses to Slash, Feint, or Adjust, the turn ends and the opposing player has the same four options. If the player chooses to Thrust, the opponent is then given two different options instead: Riposte or Dodge. Once the opponent chooses Riposte or Dodge, he is then allowed to move again. Players have two statuses that change during the game: Energy (which is preferably visible to other players) and Balance (which is preferably hidden from other players).

13 Claims, 13 Drawing Sheets

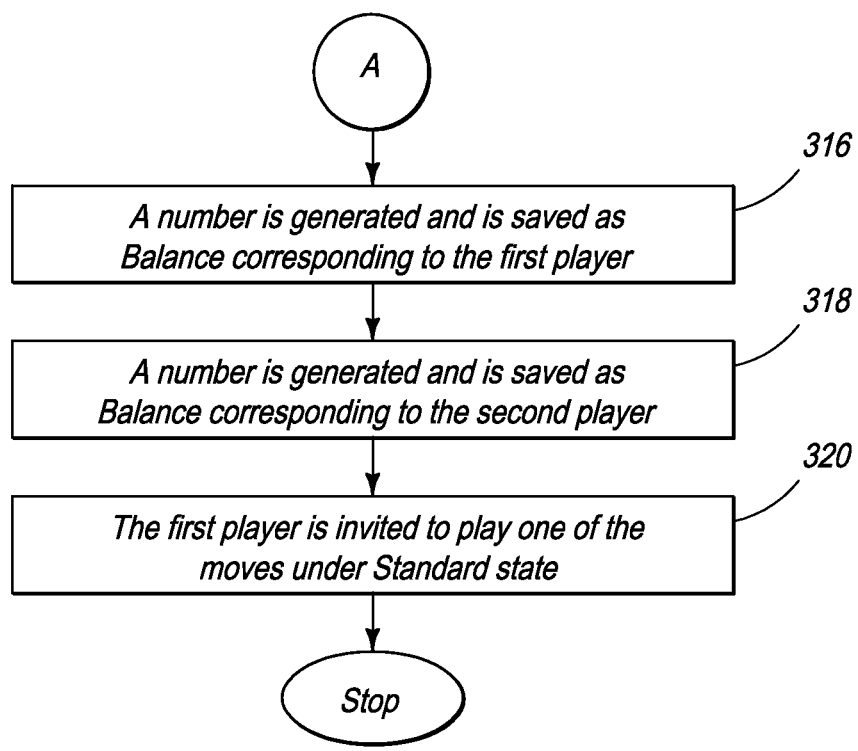
FIG. 3 (contd.)

SYSTEM AND METHOD OF CONDUCTING SIMULATED COMBAT

CROSS-REFERENCE

The present invention relies on U.S. Patent Provisional Application No. 61/149,088, filed on Feb. 2, 2009, for priority and is incorporated herein by reference.

FIELD OF THE INVENTION

The present invention relates to electronic gaming. More particularly, the present invention relates to a system and method for playing simulated combat games.

BACKGROUND OF THE INVENTION

Poker is a popular card game which has traditionally been played in casinos and poker rooms. Various versions of the game have been developed over the years. In the recent past, a multitude of such games have become available online with a host of geographically separated players via the Internet. Similarly, conventional combat video games have become available online with geographically separated players able to play each other via the Internet.

U.S. Pat. No. 6,334,614 discloses a poker game in which a partial hand is provided to a player after initial wager. The actual hand of poker involves the potential for at least two distinct games of poker being playable from that partial hand. The player may then elect to play one or more of the potential games from at least two distinct games of poker available for play with that hand. The nature of the at least two distinct games is that at least two of the games which may be played from the partial hand require decisions to be made where a decision with regard to a election of play strategy in one poker game that is intended to have or assist in getting a positive outcome is likely to have a negative effect or comprises an adverse strategy in the play of the second game. Various pay tables are provided that differ from each other, with respect to each single game, depending upon whether the player elects to play a single game with the partial poker hand or elects to play at least two games with continued play of the partial poker hand.

U.S. Pat. No. 6,485,367 discloses a self-learning gaming machine that comprises a game of chance executed by a processor in response to a wager. The game includes a plurality of symbol-bearing indicia and an adjustable parameter. The adjustable parameter is adjusted by the processor for future plays of the game based on a player's selections affecting outcomes of at least one previous plays. During the previous play, the player's selection is made after the plurality of symbol-bearing indicia are displayed.

U.S. Pat. No. 6,666,765 discloses a hint feature in a casino game such as an underlying gaming machine having a casino bonus game on a random, prevailing position, and/or hesitation basis. The patent discloses a method for providing a hint with information to the player of a casino game so as to increase the player's expected value and, therefore, to win more at the casino game. During operation of a casino game, a hint feature is displayed during a displayed decision-making game round under control of a processor. If the player follows the information found in the displayed hint, the player's expected instantaneous return from the casino game is increased. The displayed information may be the correct response, eliminating an incorrect response, and/or a response that increases the player's odds in correctly responding. For example, in a knowledge-based game displaying a question with three possible answers, the hint may be the correct answer, eliminating one of the two incorrect answers, and/or information suggesting the correct answer.

While the prior art discloses variations of conventional poker games or conventional computing games that incorporate some war or combat strategy into the overall progress of the game, to date, electronic combat games have failed to effectively integrate certain compelling, strategic features common to card games like poker, such as bluffing, into actual combat scenarios. Therefore, there is a need for a new and challenging combat game that combines the popular elements of traditional card games, such as poker, with the thrill of virtual combat.

SUMMARY OF THE INVENTION

The present application is directed toward a computer product comprising a first plurality of programmatic instructions stored on a server and a second plurality of programmatic instructions stored on said server wherein said first plurality of programmatic instructions is made network accessible for downloading onto a client device, wherein, when executed by processors, at least one of said first plurality of programmatic instructions or said second plurality of programmatic instructions cause 1) a first hidden value to be assigned to a first player and a second hidden value to be assigned to a second player, 2) a first disclosed value to be assigned to a first player and a second disclosed value to be assigned to a second player, 3) a first action to be taken, as represented by at least one animation, in response to an input from the first player and 4) at least one additional event to occur, wherein said additional event is at least one of i) a first outcome to be determined, wherein said first outcome is determined based upon a function of each of said first and second hidden values and wherein at least one of the first or second disclosed values is modified based upon said determination; ii) a replacement of the first hidden value and the second hidden value with new hidden values, and wherein at least one of the first or second disclosed values is modified based upon said replacement; or iii) revealing said hidden values and, based on a comparison of said hidden values, modifying at least one of the first or second disclosed values.

Optionally, the first and second hidden values are randomly generated numbers having values within a predefined range and wherein the first and second hidden values remain hidden from each player. Upon revealing said hidden values and comparing said hidden values, it is determined that the first hidden value is less than the second hidden value. Upon determining that the first hidden value is less than the second hidden value, the first disclosed value is decreased by a factor. Upon revealing said hidden values and comparing said hidden values, it is determined that the second hidden value is less than the first hidden value. Upon determining that the second hidden value is less than the first hidden value, the second disclosed value is decreased by a factor.

Optionally, when executed by processors, at least one of said first plurality of programmatic instructions or said second plurality of programmatic instructions further cause a second action to be taken, as represented by at least one animation, in response to an input from the second player and a second outcome to be determined, wherein said second outcome is determined based upon a function of each of said first and second hidden values and wherein at least one of the first or second disclosed values is modified based upon said determination.

Optionally, when executed by processors, at least one of said first plurality of programmatic instructions or said second plurality of programmatic instructions further cause a second action to be taken, as represented by at least one animation, in response to an input from the second player; and a replacement of the first hidden value and the second hidden value with new hidden values, and wherein at least one of the first or second disclosed values is modified based upon said replacement.

Optionally, when executed by processors, at least one of said first plurality of programmatic instructions or said second plurality of programmatic instructions further cause a second action to be taken, as represented by at least one animation, in response to an input from the second player; and a revelation of said hidden values and, based on a comparison of said hidden values, modifying at least one of the first or second disclosed values. The first outcome is determined by generating a random number, applying a function to said first hidden value and said random number to yield a first value and comparing said first value to a second value. If the first value is greater than the second value, the second disclosed value is decreased by an amount. If the first value is less than the second value, the first disclosed value is decreased by an amount.

In another embodiment, the present application is directed toward a method executed by a processor operating on at least one of a first plurality of programmatic instructions stored on a server or a second plurality of programmatic instructions stored on said server wherein said first plurality of programmatic instructions is made network accessible for downloading onto a client device, said method comprising the steps of 1) assigning a first hidden value to a first player and a second hidden value to a second player; 2) assigning a first disclosed value to a first player and a second disclosed value to a second player; 3) taking a first action, as represented by at least one animation, in response to an input from the first player; and 4) causing at least one additional event to occur, wherein said additional event is at least one of i) determining a first outcome, wherein said first outcome is determined based upon a function of each of said first and second hidden values and wherein at least one of the first or second disclosed values is modified based upon said determination; ii) replacing the first hidden value and the second hidden value with new hidden values, and wherein at least one of the first or second disclosed values is modified based upon said replacement; or iii) revealing said hidden values and, based on a comparison of said hidden values, modifying at least one of the first or second disclosed values.

Optionally, the method further comprises the steps of taking a second action, as represented by at least one animation, in response to an input from the second player; and determining a second outcome, wherein said second outcome is determined based upon a function of each of said first and second hidden values and wherein at least one of the first or second disclosed values is modified based upon said determination. Optionally, the method comprises the steps of taking a second action, as represented by at least one animation, in response to an input from the second player; and replacing the first hidden value and the second hidden value with new hidden values, and wherein at least one of the first or second disclosed values is modified based upon said replacement.

Optionally, the method further comprises the step of taking a second action in response to an input from the second player; and revealing said hidden values and, based on a comparison of said hidden values, modifying at least one of the first or second disclosed values.

Optionally, the first outcome is determined by generating a random number, applying a function to said first hidden value and said random number to yield a first value and comparing said first value to a second value. If the first value is greater than the second value, the second disclosed value is decreased by an amount. If the first value is less than the second value, the first disclosed value is decreased by an amount.

BRIEF DESCRIPTION OF THE DRAWINGS

The present invention is described by way of embodiments illustrated in the accompanying drawings wherein.

DETAILED DESCRIPTION OF THE INVENTION

Figure 1A:
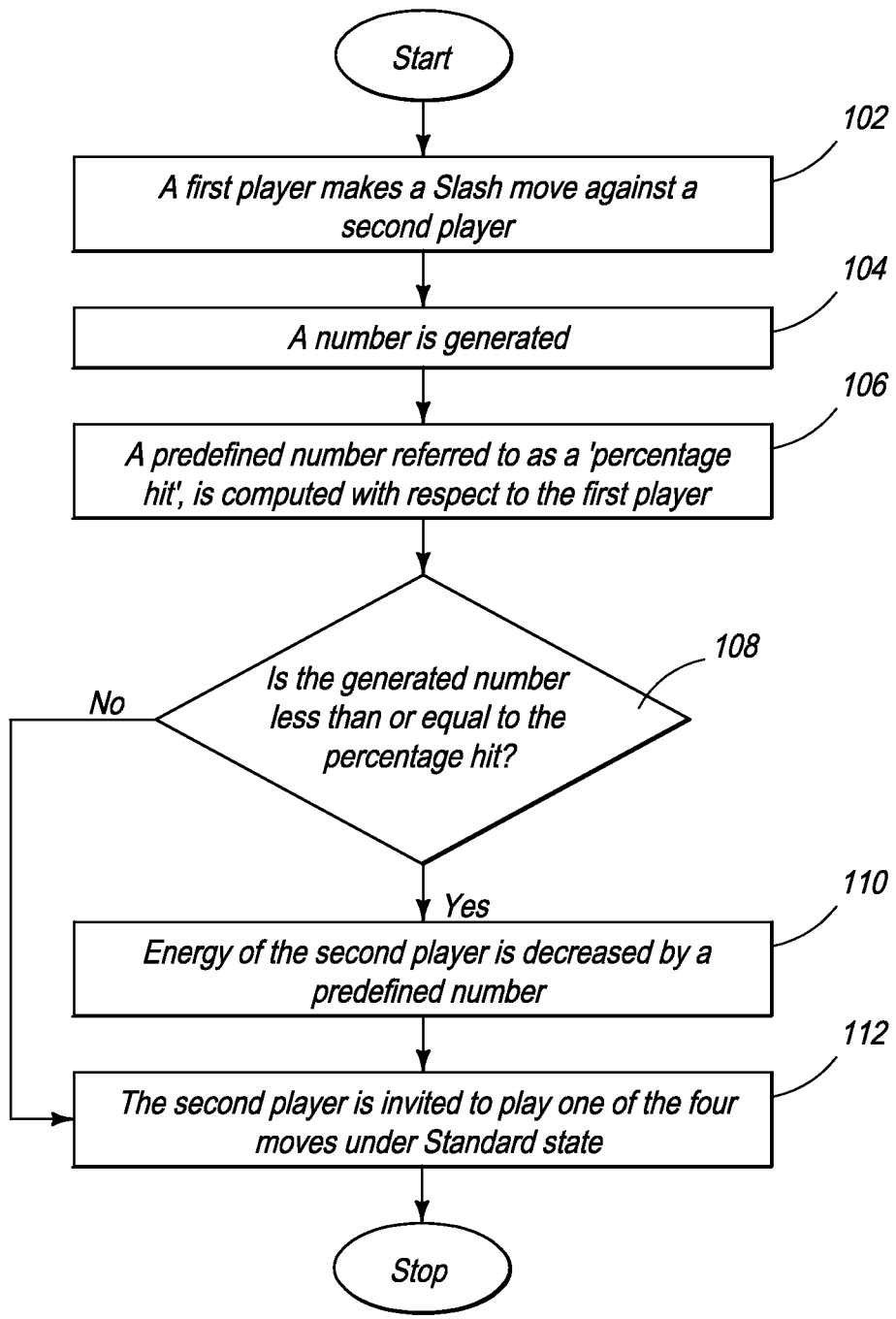
FIG. 1A is a flowchart illustrating the gameplay if a player makes a Slash move, in accordance with an embodiment of the present invention.

The present invention provides a system and method of simulated combat which can be incorporated in an online multiplayer game. It should be appreciated that the game described herein can be a standalone game effectuated by a server coordinating the actions of multiple client computers, or a game scene incorporated into a larger game with other features, actions, characters, and scenarios. It should further be appreciated that the gaming methods described herein are effectuated through a set of instructions operating on a central server to which the users' computers communicate and cause an updated character image and data related thereto to be transmitted to the users' computers. The users' computers can be any type of computing device, including desktops, laptops, mobile phones, gaming console or other processor-driven hardware. Alternatively, the set of instructions can execute locally on a user's computer, such as through Java applets, Active X software, embedded browser software, or other client software, and cause data representative of an updated character image to be transmitted to either a coordinating server or the other users' computers.

A simulated combat game which is a specific embodiment of the simulated combat method is described herein. The simulated combat game is described herein with respect to two players. The attributes and the strategies of the game play as described may be extended to a multi-player scenario as well.

The game, which can be played using multiple human players competing against each other or playing against a computer, begins with a randomly chosen player going first. The randomly chosen player makes one of four moves: Slash, Feint, Adjust, or Thrust. If the player chooses to Slash, Feint, or Adjust, the turn ends and the opposing player has the same four options. If the player chooses to Thrust, the opponent is then given two different options instead: Riposte or Dodge. Once the opponent chooses Riposte or Dodge, he is then allowed to move again. Players have two statuses that change during the game: Energy (which is preferably visible to other players) and Balance (which is preferably hidden from other players). Energy is a measure of the player's "health", and the game ends when one player's Energy reaches 0. If a Riposte is performed after a Thrust, the Balance of both players is revealed and the player with the lower Balance loses considerable Energy. Balance also impacts the percentage chance that a Slash or Feint will hit and can therefore give an opponent clues to the likelihood that a player has a particular Balance.

The game play involves the assignment of a hidden status (Balance) to each player. Any player can play a move to urge revelation of the hidden status for the purpose of comparison. Upon comparison, a player with a lower hidden status pays a considerable cost. An opponent player can decide to not reveal the hidden status by paying a much smaller cost. As the game commences, the likelihood of the hidden status lying within a particular range is revealed. Such likelihood is revealed due to at least one game parameter being based on the hidden status. The revelation of the likelihood of the hidden status lying within a particular range enables introduction of a 'bluffing' attribute into the game play. Bluffing involves tricking an opponent player into wrongly estimating the hidden status, and thereby paying a cost for keeping the hidden status concealed. The game play may also allow re-assignment of hidden status at a cost. A player may opt for re-assignment of hidden status in order to attain a more desirable hidden status. Such a move of a player provides an opponent player with information upon which the opponent can make estimations regarding the prior hidden status in order to understand how the player makes decisions and predict the player's subsequent moves.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

One of ordinary skill in the art would appreciate that the game embodiments disclosed herein can be played by a plurality of players, each of which accesses the game through client software (set of programmatic instructions) executing on a client device, such as a PC, mobile phone, television, tablet computer, or other device, which, during execution, transmits data generated through the selection or input of each player to a game controller application that can execute on a processor located on the client device, within a server on a local network, or within a server remote from on a central server. The game controller application aggregates received data, calculates combat scenarios, and communicates game play results based upon the received data from all players. One of ordinary skill in the art would further appreciate that all software functions and features described herein can be effectuated through any combination of centralized, remote, distributed, or integrated programmatic instructions. For example, the entire game can be effectuated by a) a single application executing on a client device, without requiring any remote server support, b) a client side application, such as a Java applet running via a browser, on a client device in communication with robust server application support, or c) a client side application, such as a mobile phone application that generates all figures and movements locally but relies on server support to calculate the combat results of each player's inputs and communicate those data results to the mobile phone application.

In a first embodiment, a fixed pre-defined number referred to as 'Energy' and a randomly generated number referred to as 'Balance' is assigned to each of a first player and a second player at the time of commencement of the game. Each player can be a person located local or remote to each other or one of the players can be the gaming application itself. A game session commences with both the players being assigned predefined Energy and randomly determined Balance values. For example, the Energy of both the players may be initialized to 1000; and Balance may be set randomly, by using a random number generator, to a number between 1 and 10.

As the game progresses, the players lose Energy and the game ends when the Energy of any player becomes zero. During the game play, each player makes one of a plurality of predefined moves with an intention of making the opponent player lose Energy. The Balance value of each player is visible only to the respective player and is hidden from the opponent player. In an embodiment, the Balance of a player is hidden from the player as well and is revealed either at pre-defined intervals of time or at a cost of losing a predefined amount of Energy.

A random number, such as a number between 1 and 100, is generated with respect to each player to determine which player moves first. In an embodiment, if the generated random number is less than a predefined number, for example 51, a first player is chosen to begin the game; else, the second player moves first.

During the game play, each player is in one of a first or a second state, which may be referred to as a 'Standard' state and a 'Response' state, respectively. In a Standard state, a player plays one of a first, a second, a third move, or a fourth move which are referred to as 'Slash', 'Feint', 'Adjust' or 'Thrust'. If the first player makes a Slash, Feint or Adjust move, the second player is provided with an option of making one of the four Standard state moves, namely, Slash, Feint, Adjust or Thrust. If the first player makes a Thrust move, the second player enters a Response state and can play one of a first or a second move, referred to as a 'Riposte' or 'Dodge' respectively.

The present invention would now be discussed in context of embodiments as illustrated in the accompanying drawings.

In various embodiments, before commencement of game play the Energy and Balance values of the players are set to predefined values. For example, the Energy of each player may be set as 1000 and the Balance of each player may be set by generating a random number between 1 and 10 corresponding to each player.

FIG. 1A is a flowchart illustrating the game play if a player makes a Slash move. At step 102, the first player makes a Slash move against the second player. At step 104, a random number is generated. In an embodiment, the randomly generated number lies between 1 and 100, although any number unit can be used. The generated number is not revealed to the players. At step 106, a predefined number referred to as a 'percentage hit', is computed with respect to the first player. The percentage hit is based on, or derived from, the Balance of the first player.

In an embodiment, the percentage hit is computed by multiplying the Balance times a factor, which can be any number, including positive numbers, negative numbers, and/or fractions. In an embodiment, the percentage hit for a Slash move is computed using the formula: % Hit=Balance*4. In other embodiments, the percentage hit may be any function of the Balance. In one embodiment, the computed percentage hit is not revealed to the players; in another embodiment, the computer percentage hit for each player is only revealed to the player, not to the opponent; in another embodiment, the computer percentage hit for each player is revealed to each player. At step 108, it is determined if the generated random number is less than or equal to the percentage hit. At step 110, the Energy of the second player is decreased by a predefined number, if the generated number is less than or equal to the percentage hit.

In an embodiment, the Energy of the second player is reduced by any number, including positive numbers, negative numbers, and/or fractions, such as 50. The Balance value impacts the percentage chance of a Slash move being a success, i.e. causing an opponent player to lose Energy. Hence, the success or failure of a Slash move made by a player provides the opponent player with clues regarding the Balance of the player. At step 112, the second player is invited to play one of the four moves under Standard state, if the generated number is greater than the percentage hit.

Figure 1B:
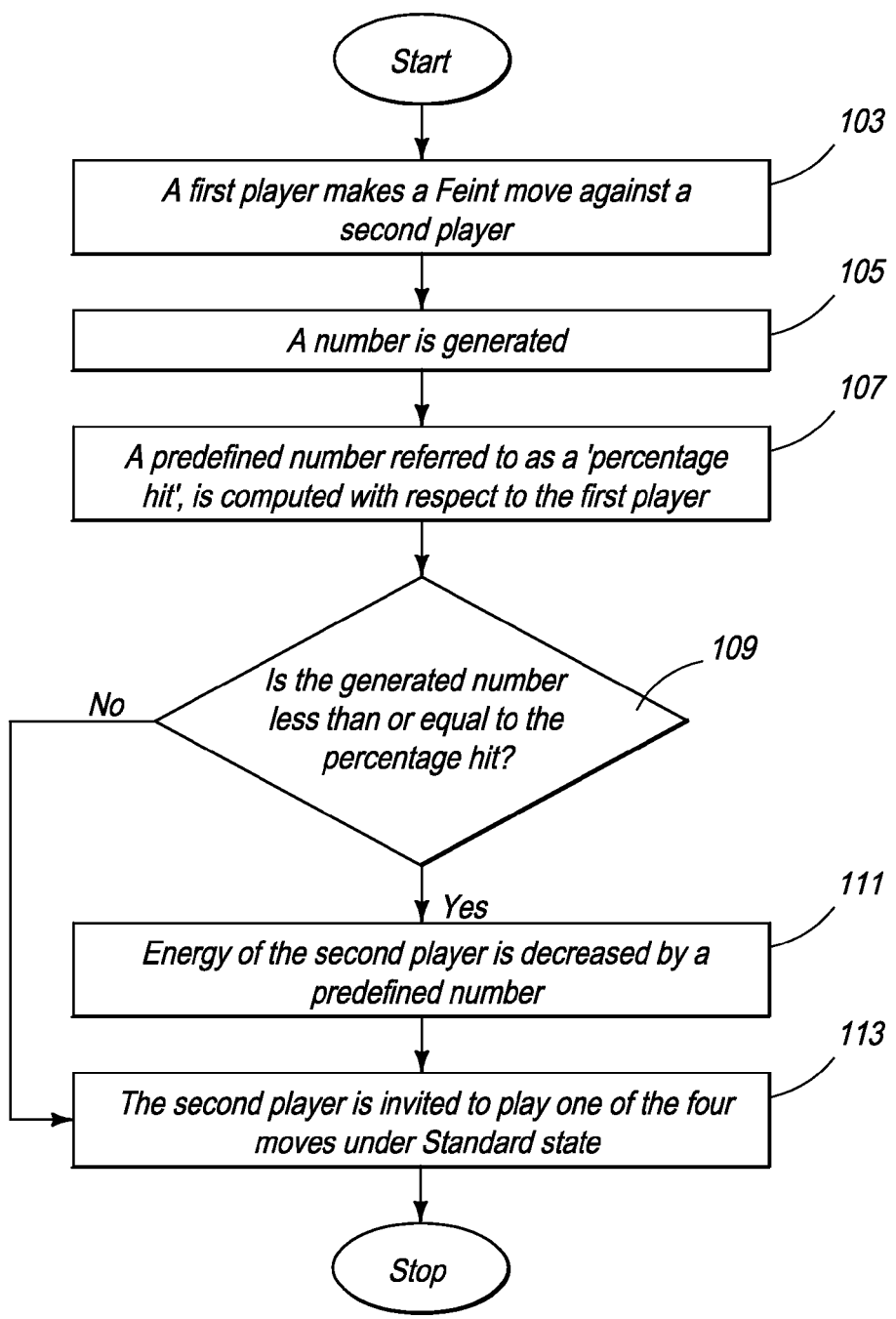
FIG. 1B is a flowchart illustrating the gameplay if a player makes a Feint move, in accordance with an embodiment of the present invention.

FIG. 1B is a flowchart illustrating the game play if a player makes a Feint move. At step 103, the first player makes a Feint move against the second player. At step 105, a random number is generated. In an embodiment the randomly generated number lies between 1 and 100, although any number unit can be used. The generated number is not revealed to the players. At step 107, a predefined number referred to as a 'percentage hit', is computed with respect to the first player. The percentage hit is based on, or derived from, the Balance of the first player.

In an embodiment, the percentage hit is computed by multiplying the Balance times a factor, or fraction thereof. In an embodiment the percentage hit for a Feint move is computed using the formula: % Hit=ABS (Balance−10)*5, where ABS refers to the absolute value of the value within the parentheses. In other embodiments, the percentage hit may be any function of the Balance. It should be appreciated that, as a player's balance decreases, the likelihood of a Feint move being successful increases. Therefore, a second player can deduce that a first player who chooses to play a number of Feint moves, in preference to Slash moves, likely has a lower balance. For example, with a Balance=2, the percentage hit for a Slash move may be 8% while the percentage hit for a Feint move may be 40%. Similarly, a second player can deduce that a first player who chooses to play a number of Slash moves, in preference to Feint moves, likely has a higher balance.

In one embodiment, the computed percentage hit is not revealed to the players; in another embodiment, the computer percentage hit for each player is only revealed to the player, not to the opponent; in another embodiment, the computer percentage hit for each player is revealed to each player.

At step 109, it is determined if the generated random number is less than or equal to the percentage hit. At step 111, the Energy of the second player is decreased by a predefined number, if the generated number is less than or equal to the percentage hit. In an embodiment the Energy of the second player is reduced by 50. In an embodiment, the predefined number by which the Energy of the second player is reduced is any number, or fraction thereof. The Balance value impacts the percentage chance of a Feint move being a success, i.e. causing an opponent player to lose Energy. Hence, the success or failure of a Feint move made by a player provides the opponent player with clues regarding the Balance of the player. At step 113, the second player is invited to play one of the four moves under Standard state, if the generated number is greater than the percentage hit.

Figure 2:
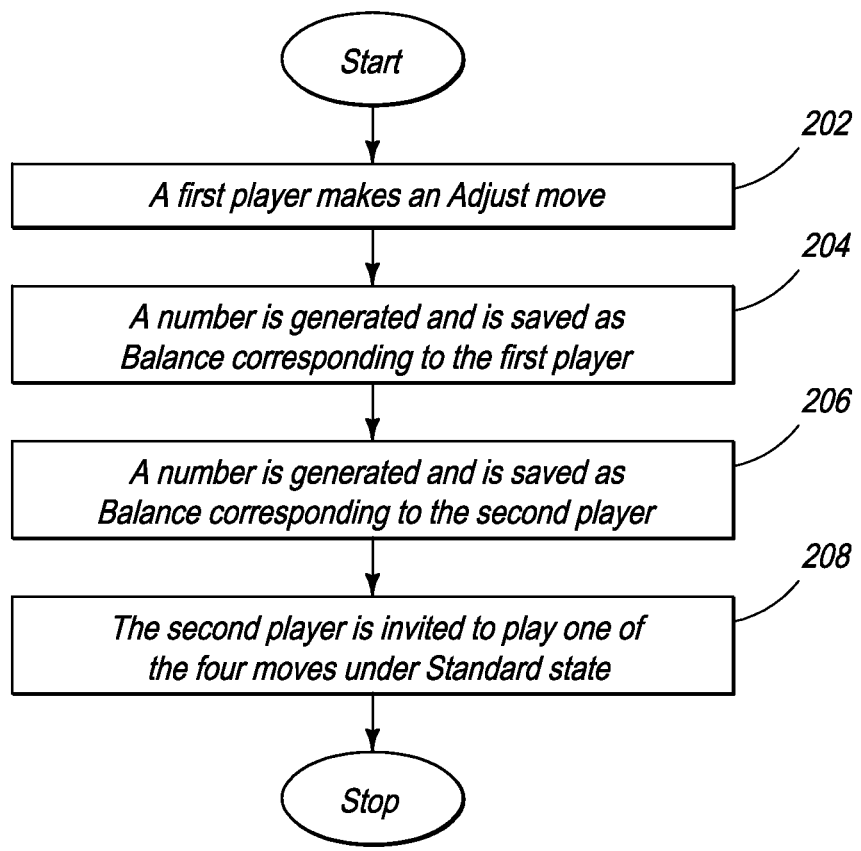
FIG. 2 is a flowchart illustrating the gameplay if a player makes an Adjust move, in accordance with an embodiment of the present invention.

By playing an Adjust move, a player causes the Balance of each player to be reset to new random values. FIG. 2 is a flowchart illustrating the game play if a player makes an Adjust move. At step 202, the first player makes an Adjust move. At step 204, a random number is generated and is saved as Balance corresponding to the first player. The Balance corresponding to the first player is not revealed to the second player. At step 206, a random number is generated and is saved as Balance corresponding to the second player. The Balance corresponding to the second player is not revealed to the first player. In an embodiment, the randomly generated numbers lie between 1 and 100, although any number unit can be generated. At step 208, the second player is invited to play one of the four moves under Standard state.

By making a Thrust move, a player urges the opponent player to reveal Balance values so that a comparison between the Balances of the two players may be made. Upon comparison, the player possessing a lower Balance loses an amount of Energy equal to a factor, or any fraction thereof. Once a thrust is made by any player, the opponent player enters the Response state and can either choose to agree to disclose Balance, or can evade or dodge the Thrust move at a cost of losing a predefined energy. In one embodiment, the amount of Energy lost if a player evades a Thrust move is less than the amount of Energy that is lost if, upon revelation, the player's Balance is less than the opponent player's Balance.

Figure 3:
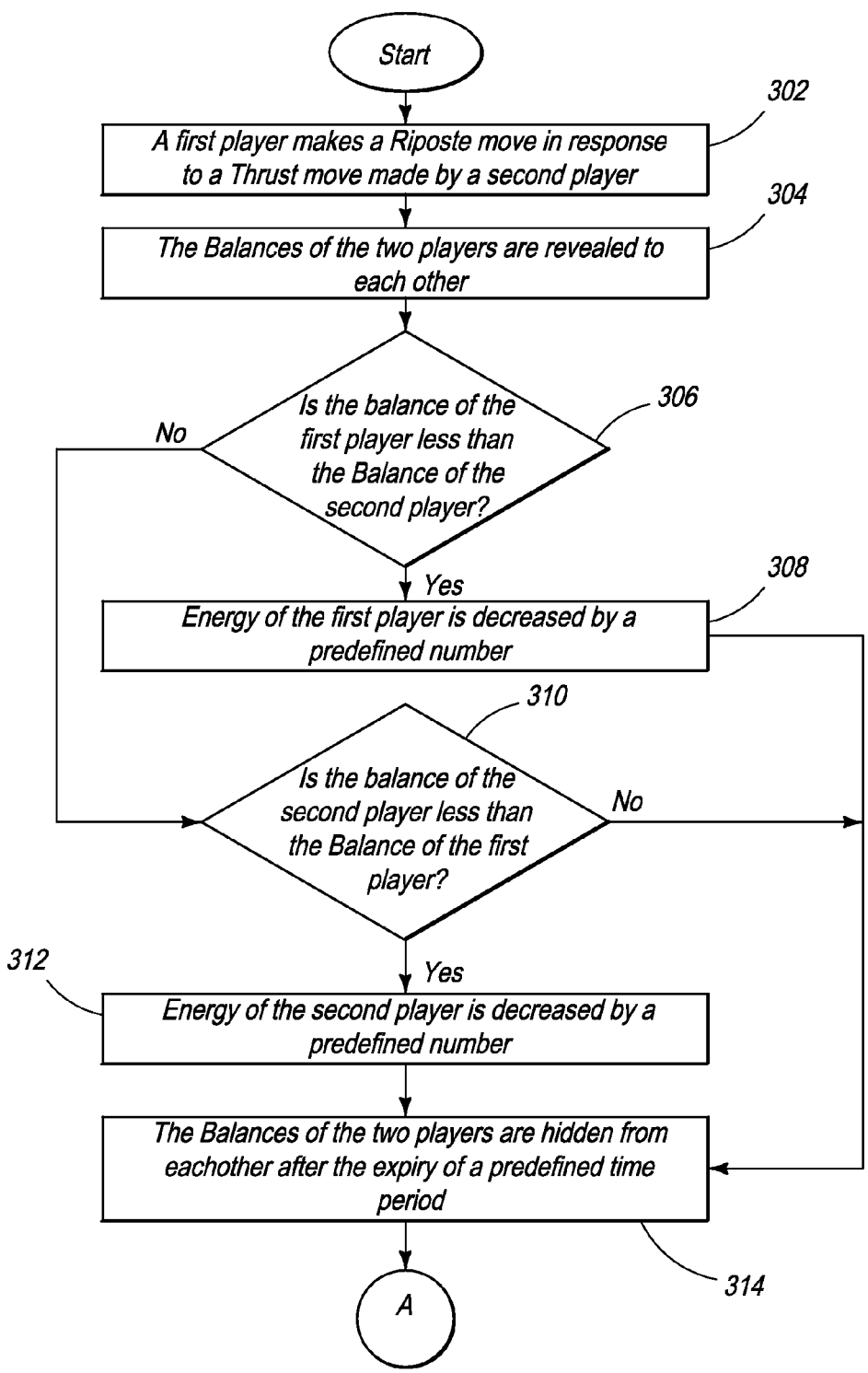
FIG. 3 is a flowchart illustrating the gameplay if a player makes a Riposte move, in accordance with an embodiment of the present invention.

FIG. 3 is a flowchart illustrating the game play if a player makes a Riposte move. At step 302, the first player makes a Riposte move in response to the thrust move made by the second player. At step 304, the Balances of the two players are revealed to each other. At step 306, it is determined if the Balance of the first player is less than the Balance of the second player. At step 308, the Energy of first player is decreased by a predefined number if the first player has a lower Balance than the second player. In an embodiment, the Energy of the first player is decreased by 250 if the first player has a lower Balance than the second player. At step 310, it is determined if the Balance of the second player is less than the Balance of the first player. At step 312, the Energy of second player is decreased by a predefined number if the second player has a lower Balance than the first player. In an embodiment, the Energy of the second player is decreased by 250 if the second player has a lower Balance than the first player. At step 314, the Balances of the two players are hidden from each other after the expiry of a predefined time period, e.g. 3 seconds. At step 316, a number is generated and is saved as Balance corresponding to the first player. The Balance corresponding to the first player is not revealed to the second player. At step 318, a number is generated and is saved as Balance corresponding to the second player. The Balance corresponding to the second player is not revealed to the first player. At step 320, the first player is invited to play one of the four moves under Standard state.

Figure 4:
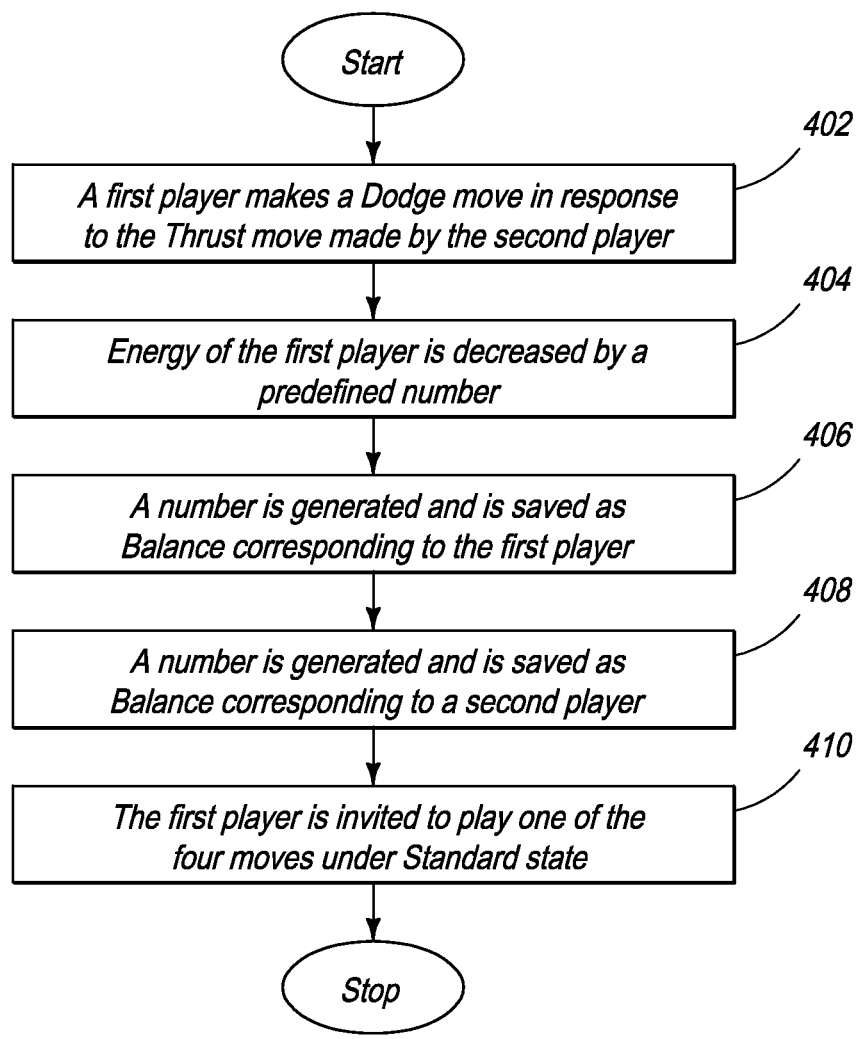
FIG. 4 is a flowchart illustrating the gameplay if a player makes a Dodge move, in accordance with an embodiment of the present invention.

FIG. 4 is a flowchart illustrating the game play if a player makes a Dodge move. At step 402, the first player makes a Dodge move in response to the thrust move made by the second player. At step 404, the Energy of first player is decreased by a predefined number. In an embodiment, the Energy of the first player is decreased by 50. At step 406, a number is generated and is saved as Balance corresponding to the first player. The Balance corresponding to the first player is not revealed to the second player. At step 408, a number is generated and is saved as Balance corresponding to the second player. The Balance corresponding to the second player is not revealed to the first player. At step 410, the first player is invited to play one of the four moves under Standard state.

In an embodiment of the present invention, if a player does not make a move within a predefined time period e.g. 15 seconds, a predefined move is made on the player's behalf. In an exemplary embodiment, if a player in a Standard state does not play a move within 15 seconds, a Slash move is played on the player's behalf. If a player in a Response state does not play a move within 15 seconds, a Dodge move is played on the player's behalf.

Hence, the present invention describes a simulated combat game wherein outcomes of simulated physical combat are determined more by the considered, strategic choices of participants rather than by chance, rapid button pressing, hand-eye coordination, or random rolls. The simulated combat game permits a player with a lower Balance to bluff an opponent player with a higher Balance and cause that player to lose Energy. Further, the frequency of successful or unsuccessful hits, resulting from a player's Slash moves allows an opponent player to estimate the Balance of the player.

Players can use indicators of strength, such as the frequency of hits, or opponent player's choices to estimate the strength of the opponent and predict the player's future moves. For example, during a game session players A and B have a Balance of 3 and 7 respectively. Player A and B both perform a Slash move three times in a row. All three times Player A gets a Hit, in spite of a low Balance, thereby causing Player B to assume that Player A has a high Balance. Player A predicts such assumption made by player B and takes advantage of the situation by making a Thrust move. Player B Dodges the Thrust move due to the wrong assumption. Hence, even though player B had a higher Balance, player A bluffed Player B into Dodging the Thrust and thereby losing Energy.

It should be appreciated that the present virtual combat game has a number of unique attributes:

1. A hidden status (balance) that gets revealed if a player makes the decision to try to compare them (i.e. in a thrust/riposte combination)
2. A cost, e.g. losing energy, to deciding to not reveal hidden status (i.e., in a thrust/dodge combination).
3. A process that, during game play, implicitly reveals a likelihood of some amount of hidden status (balance). In one embodiment, this occurs because players get a sense of each player's hit percentage, which is derived from the hidden status (balance). For example, if player A has a high hit rate, he probably has a high balance. If player B has a low hit rate (e.g. not landing his slashes), he probably has a low balance. In another embodiment, this occurs because a player can deduce hidden status (balance) amounts from an opponent's choice of Feint or Slash moves.
4. A cost, e.g. losing energy, to change one's hidden status (i.e. in an adjust scenario). It should be appreciated that, if a player is adjusting a greater than average amount, it indicates the player may be risk adverse, will not bluff, and will only play with a high balance.

The combination of the aforementioned attributes enables bluffing. For example, a player with a low balance can "bluff" by thrusting and hoping the opponent dodges. Relying on the historical hit percentage, the opponent may decide the player is bluffing, in which case he will riposte and call the bluff or may decide the player is not bluffing, in which case he will dodge. In another example, a player with a low balance decides to "bluff" immediately by thrusting on the first few moves before his low hit percentage becomes obvious.

In an embodiment of the present invention, the simulated combat game described herein may be played by visiting a predefined website via the Internet. A player visiting the predefined web site is presented with options to login to an account, practice as a guest, or duel as a guest. In another embodiment, the simulated combat game may be played on a mobile device such as an iPhone.

Figure 5:
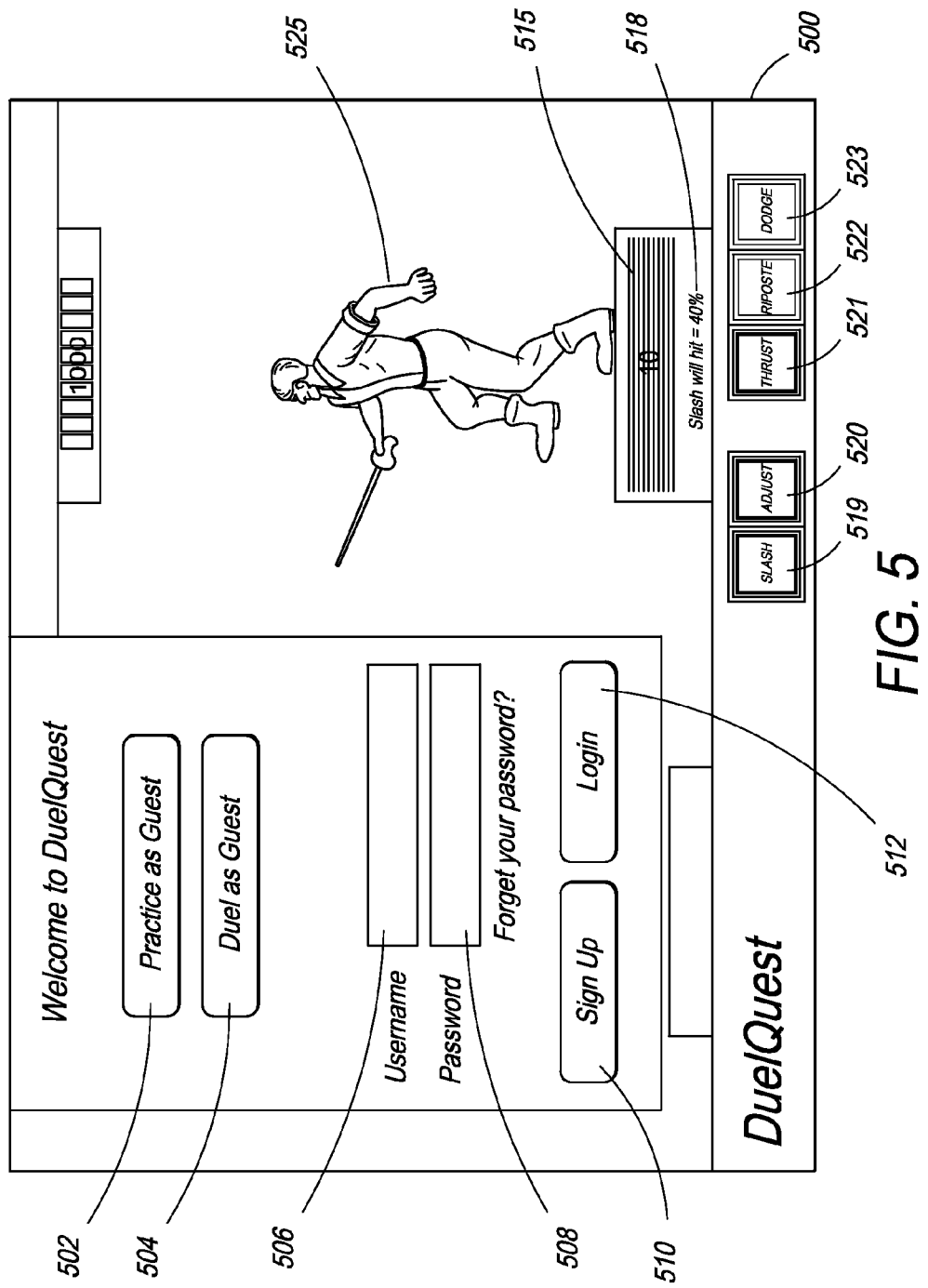
FIG. 5 illustrates an exemplary screenshot presented to a player visiting the game website, in accordance with an embodiment of the present invention.

FIG. 5 illustrates an exemplary screenshot 500 presented to a player visiting the game website. Screenshot 500 comprises a button 502 labeled 'practice as guest', a button 504 labeled 'duel as guest', a textbox 506 labeled 'username', a textbox 508 labeled 'password', a button 510 labeled 'sign up', and a button 512 labeled 'login'. The player may choose to practice as a guest by pressing button 502, in which case, a game session commences and system generated moves are made in response to moves made by the player. The player may also choose to play as a guest by pressing button 504, in which case, the player is presented with an option of finding an opponent player, from among the players online and logged into the game website at that time. The player may choose a specific opponent player or may be assigned one randomly. The player may login to an account by providing a predefined identification string and a corresponding password in the textboxes 506 and 508 respectively, and pressing button 512. The player obtains the identification string and password at the time of creating the account with the game website. An account may be created by pressing button 510.

FIG. 5 also depicts a set of interface regions that depict a player's energy level 515 and hit percentage 518 and that provide buttons, which, when engaged by a user, causes the player's character to slash 519, adjust 520, thrust 521, riposte 522, dodge 523 or feint. One of ordinary skill in the art would appreciate that the player's depicted character 525 can be of any type or image, whether human, animal, imaginary, non-living, or other.

Figure 6:
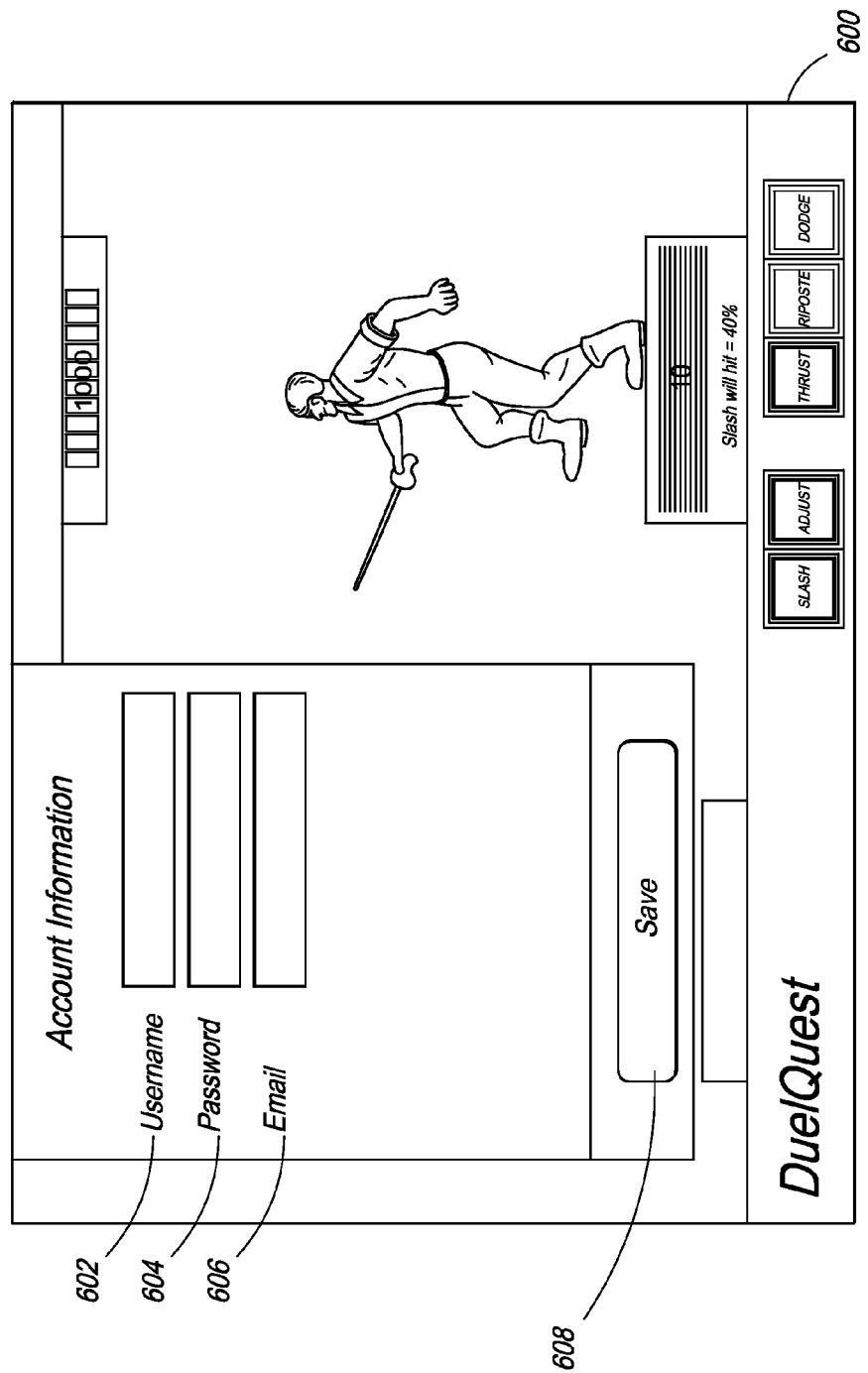
FIG. 6 illustrates an exemplary screenshot presented to a player for creating an account, in accordance with an embodiment of the present invention.

FIG. 6 illustrates an exemplary screenshot presented to a player for creating an account, in accordance with an embodiment of the present invention. Screenshot 600 comprises a textbox 602 labeled 'username', a textbox 604 labeled 'password', a textbox 606 labeled 'email address', and a button 608 labeled 'save'. The player may create an account by providing information such as name, password and email address in textboxes 602, 604 and 606 respectively and pressing button 608. In an embodiment, the player may also be required to provide other information such as a street address for creating an account. Upon pressing the button 608, the information provided by the player is saved in a database corresponding to the gaming website and a gaming account is created with respect to the player. A gaming record of each player having an account with the game website is also maintained in the database. Information such as number of games won and identities of the players defeated is recorded corresponding to each account.

Figure 7:
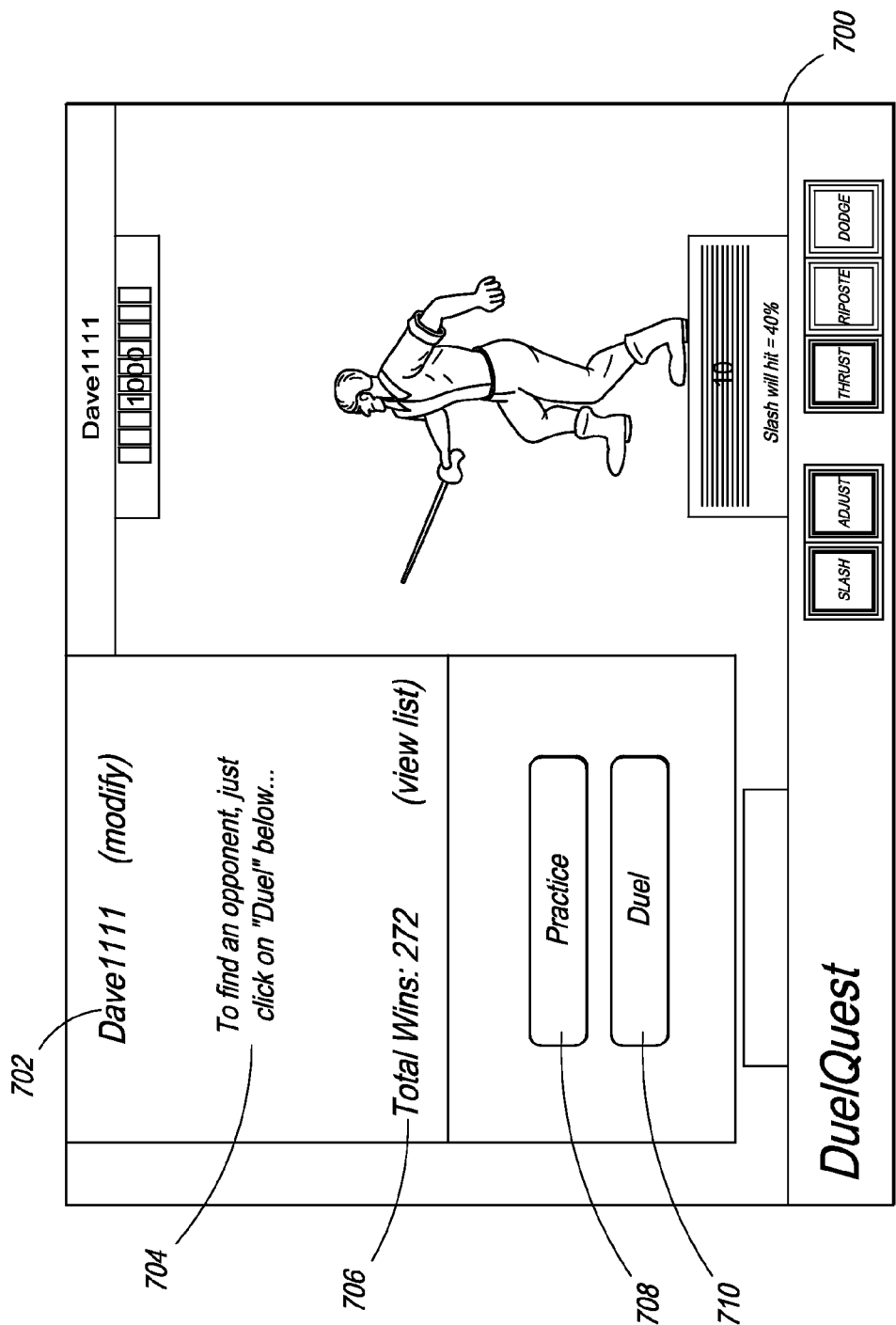
FIG. 7 illustrates an exemplary screenshot presented to a player for choosing an opponent player, in accordance with an embodiment of the present invention.

An option of finding an opponent player, from among the players online and logged into the game website at that time, is presented to the player if the player logs into an account or chooses to duel as a guest. FIG. 7 illustrates an exemplary screenshot presented to a player for choosing an opponent player. Screenshot 700 comprises a user identification label 702, an instruction label 704, a practice instruction button 708 and a dueling button 710. The label 702 displays the username of the player, e.g. 'Dave1111' and label 706 displays the number of games won by the player, e.g. 'Total Wins 272'. In an embodiment, a complete list of games won may also be viewed. Label 704 provides instructions to user for choosing an opponent player by pressing button 710 labeled 'duel'. The player may also choose to play against system generated moves by pressing the button 708 labeled 'practice'. The player may choose a specific opponent player or may be assigned one randomly.

Figure 8:
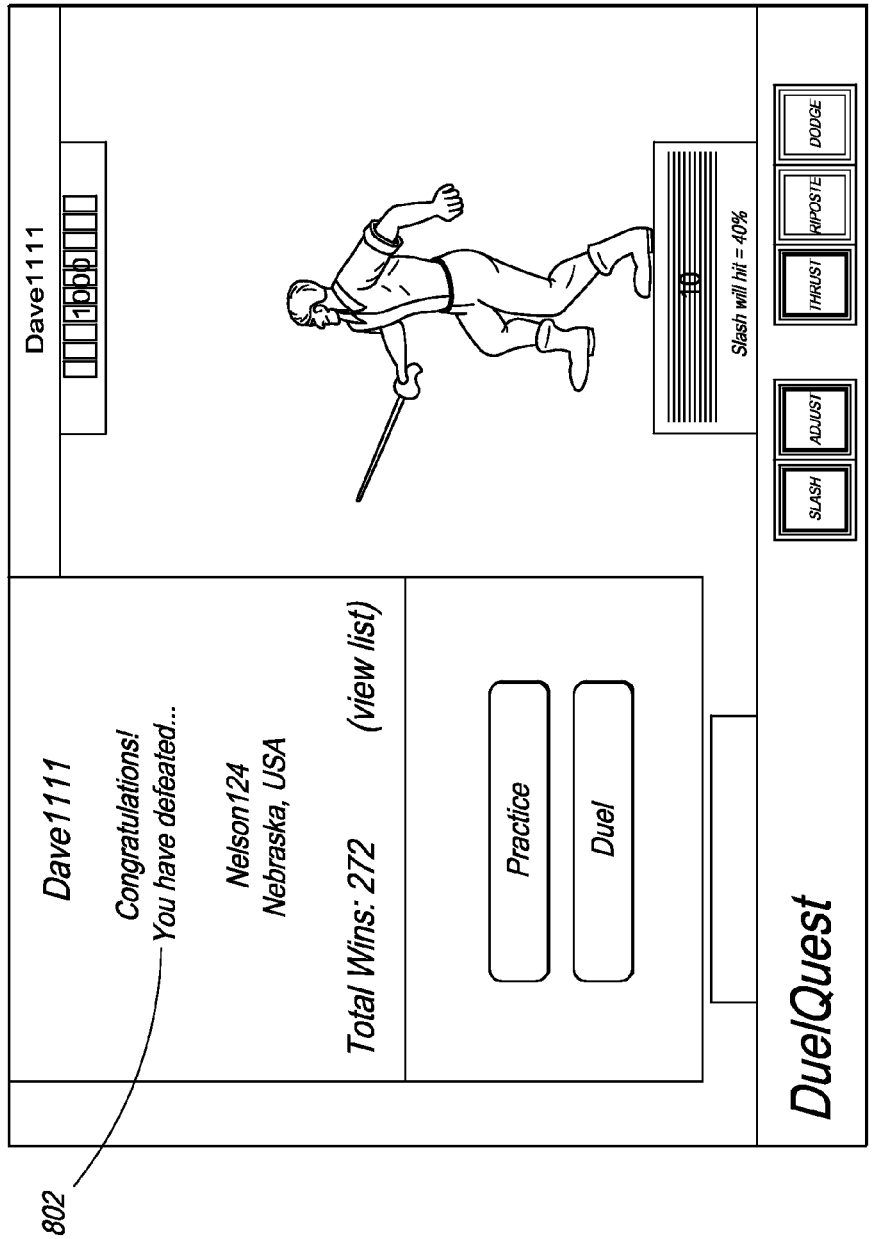
FIG. 8 illustrates an exemplary screenshot presented to a winning player, in accordance with an embodiment of the present invention.

When the game ends, the winning player is presented with a screen that indicates that a win has been recorded along with the username and geographic location (country, state/province) of the person defeated player. In an embodiment, losses are not recorded. FIG. 8 illustrates an exemplary screenshot presented to a winning player, in accordance with an embodiment of the present invention. Label 802 displays a message congratulating the winning player and also provides the name and address of the defeated player, e.g. 'Nelson 124, Nebraska, U.S.A.'.

Figure 9:
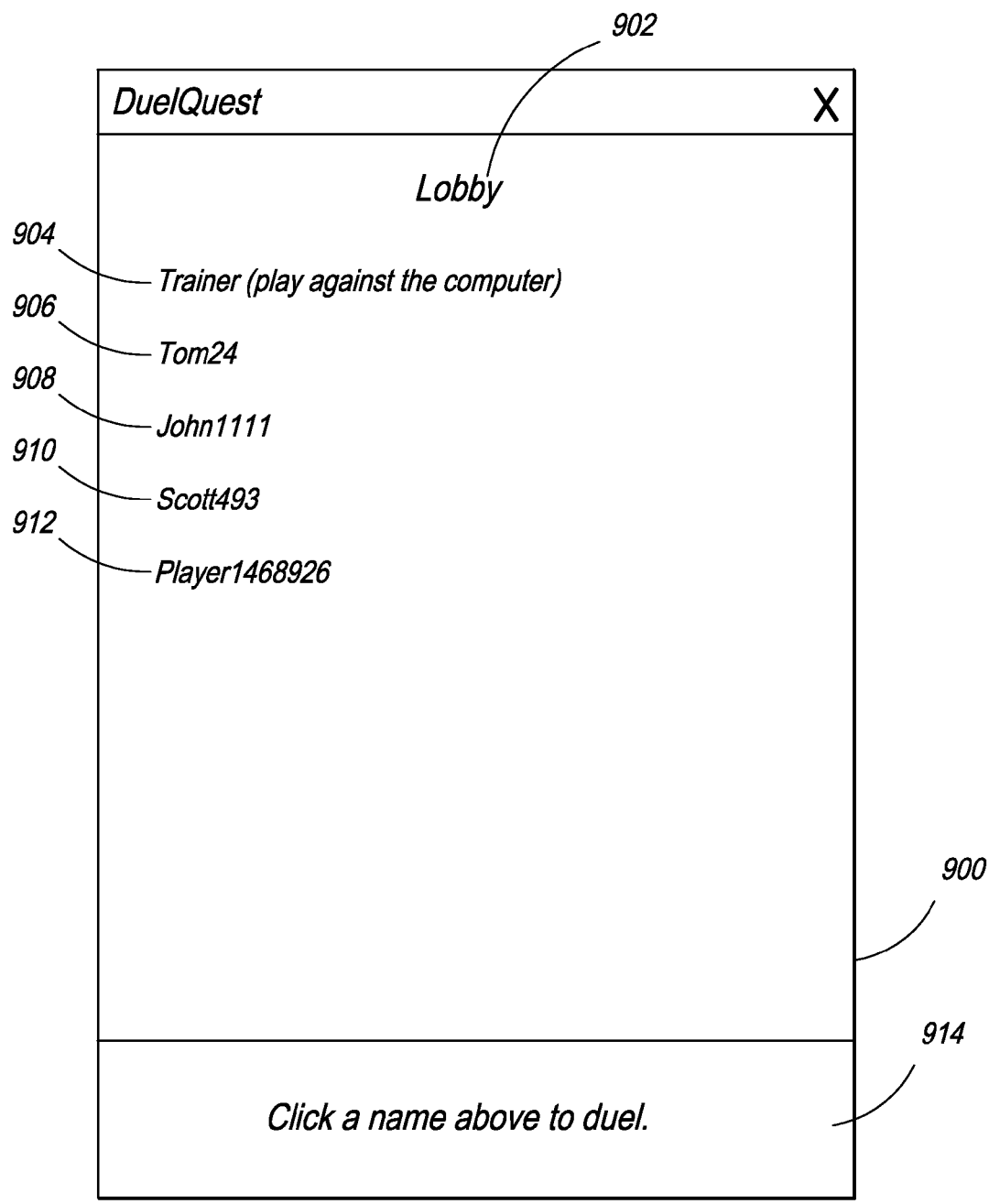
FIG. 9 illustrates another exemplary screenshot presented to a player for choosing an opponent player.

FIG. 9 illustrates another exemplary screenshot presented to a player for choosing an opponent player. Screenshot 900 comprises a screen identification label 900, player identification buttons 902, 904, 906, 908 and 910, and an instruction providing label 912. The button 902 titled 'Trainer' provides a user an option to play against system generated moves by clicking the button. A player may choose this option to improve his gaming skills. Buttons 904 to 910 correspond to usernames of the players available for playing at the given instant of time, e.g. 'Tom24', 'John111', etc. Players available for playing who have not signed in by providing a user name are assigned system generated usernames such as 'player1468926' as illustrated by button 912. A user may choose any one of the players by clicking a corresponding button 904 to 912. Label 914 provides a user with instructions to select an opponent by clicking one of the buttons 904 to 912.

Figure 10:
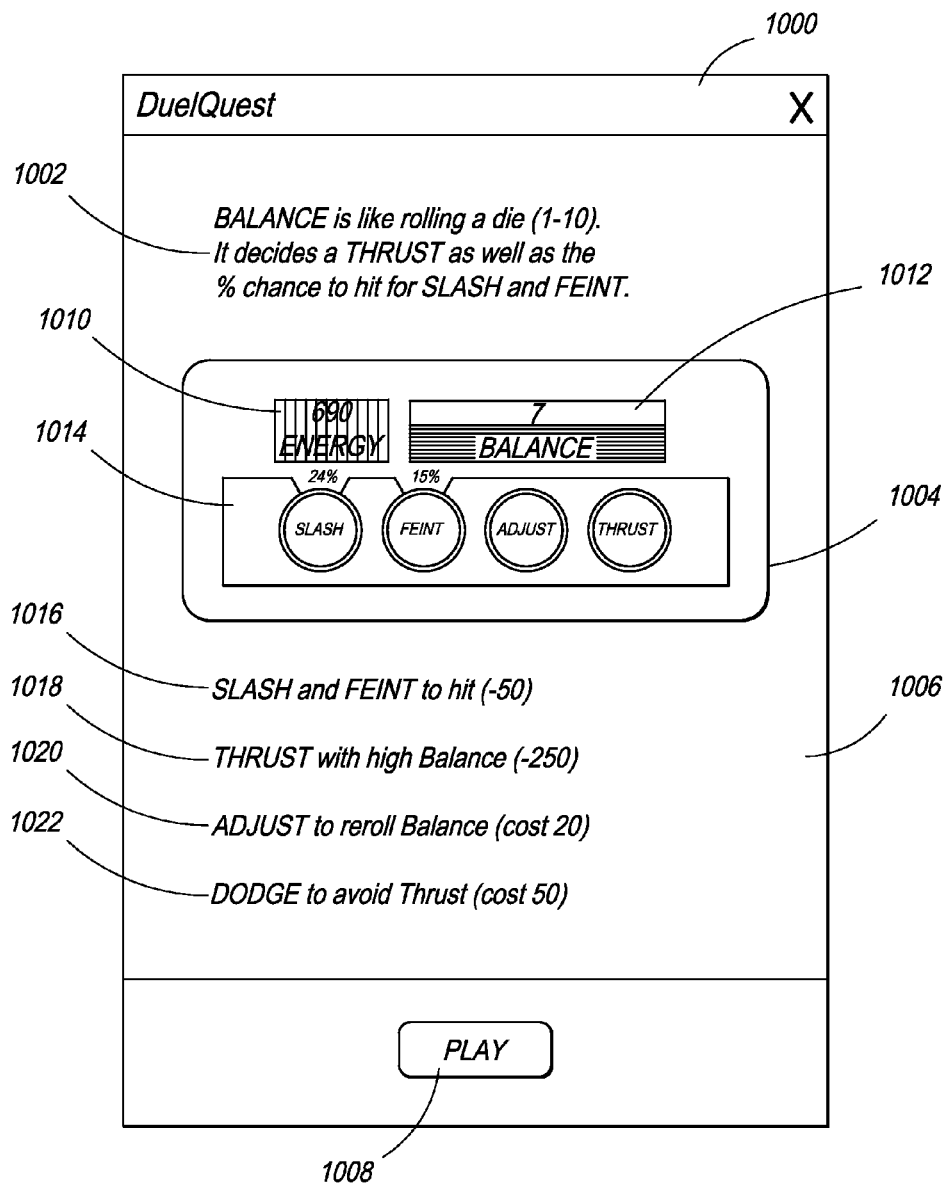
FIG. 10 illustrates an exemplary screenshot presented to a player for providing information regarding parameters of the game.

FIG. 10 illustrates an exemplary screenshot presented to a player for providing information regarding parameters of the game. Screenshot 1000 comprises a first section 1002, a second section 1004, a third section 1006, and a button 1008. Section 1002 comprises a label providing information regarding Balance assignment. A user is informed that the Balance value is a randomly generated number and impacts the outcomes of a Thrust move as well as the generation of percentage hit during Slash and Feint moves, via section 1002. Section 1004 is a pictorial representation of the Energy and Balance values of a player along with playable moves available. Label 1010 is a bar graph representation of the amount of Energy remaining, e.g. 690. Label 1012 depicts the Balance of a user, e.g. 7. Label 1014 depicts the moves available, i.e. Slash, Feint, Adjust and Thrust along with the percentage hits computed for Slash and Feint as 24% and 26% respectively. Section 1006 comprises a label 1016 providing information regarding energy lost by an opponent player, e.g. −50, if a Slash or a Feint move is successful; a label 1018 providing information regarding energy lost by an opponent player, e.g. −250, if a Thrust move is made revealing a higher Balance than the opponent player; a label 1020 providing information regarding energy lost by a player, e.g. 20, if a Adjust move is made causing re-assignment of Balance; a label 1022 providing information regarding energy lost by a player, e.g. 50, if a Dodge move is played to avoid a Thrust move. A player may commence/resume gameplay by clicking button 1008.

Figure 11:
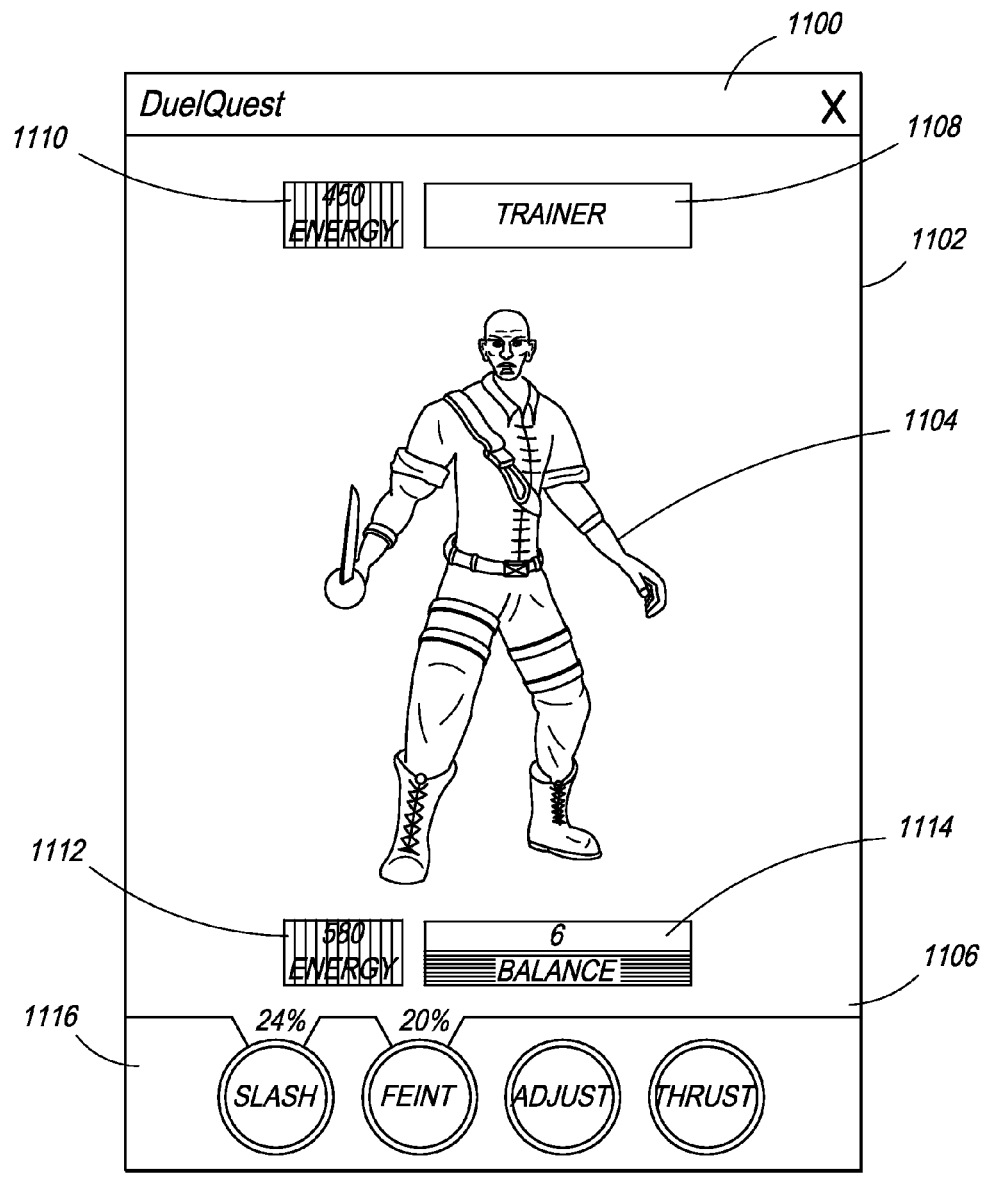
FIG. 11 illustrates an exemplary screenshot presented to a player for providing status information.

FIG. 11 illustrates an exemplary screenshot presented to a player for providing status information. Screenshot 1100 comprises a first section 1102, a second section 1104 and a third section 1106. The first section 1102 provides a player with status information corresponding to an opponent player. Label 1108 displays a user name of the opponent player, e.g. 'Trainer'. Label 1110 displays Energy of the opponent player in a graphical format, e.g. 450. Section 1104 depicts an animated representation of the player. Section 1106 is a pictorial representation of the Energy and Balance values of the player along with playable moves available. Label 1112 is a graphical representation of the amount of Energy remaining, e.g. 580. Label 1114 is a graphical representation of the Balance remaining, e.g. 6. Label 1116 depicts the moves available, i.e. Slash, Feint, Adjust and Thrust along with the percentage hits computed for Slash and Feint as 24% and 20% respectively.

A player visiting the game website may choose to either practice as a guest or duel as a guest. Upon choosing to practice as a guest, a game session commences and system generated moves are made in response to the moves made by the player. In exemplary embodiments, system generated moves in response to moves made by the player are made by using the following predefined rules, where all percentages are obtained by number generation:

It should be appreciated that the present invention employs constraints on the progress, order, sequence, and/or options available to each player. For example, in a preferred embodiment, the following constraints are imposed on the options available to each player: a) each player is required to choose a combat move, as described above, within a predefined period of time (e.g. 5, 10, 15, 30, 45, or 60 seconds), otherwise the system automatically chooses a default combat move, which can be any of the moves detailed herein and b) the move a second player can make is constrained based on the type of move previously made by the first player. In particular, if a first player performed a Slash or Adjust move, then the second player may play a standard move (such as Slash, Feint or Adjust) or a challenging move (such as Thrust). Alternatively, if a first player performed a challenging move (such as Thrust), then the second player may only play a Riposte or Dodge move in response to the challenging move.

It should further be appreciated that the present invention causes certain data to be recorded during the progress of play. Preferably, while there is no persistent data recorded during game play, certain session variables are recorded by either the game controller application or client side application: Game Status, Player Turn, Energy for Player A, Energy for Player B, Balance for Player A, Balance for Player B, Chance To Hit with a Slash (derived from Balance) for Player A, Chance To Hit with a Slash (derived from Balance) for Player B, Random Hit Roll, Whether or not Slash successful, and Whether or not Riposte successful. Additionally, it is preferred to record, at the beginning of the game, the following data: Game Status (in play), Energy for Player A, Energy for Player B, Player Turn (A or B), Turn Type, Balance for Player A, Balance for Player B, Chance To Hit with a Slash (derived from Balance) for Player A, and Chance To Hit with a Slash (derived from Balance) for Player B.

When a player performs a Slash, the following data is preferably recorded: Random Hit Roll, Whether or not Slash was successful based on Hit Roll, Energy of opponent if Slash successful, and Player Turn. When a player performs an Adjust, the following data is preferably recorded: Energy of player, Balance for Player A, Balance for Player B, Chance to Hit for Player A, Chance to Hit for Player B, and Player Turn. When a player performs a Thrust, the following data is preferably recorded: Turn Type and Player Turn. When a player performs a Riposte, the following data is preferably recorded: Whether or not Riposte successful based on Balance of both players, if successful modify Energy of opponent, if unsuccessful modify Energy of player, Turn Type, Balance for Player A, Balance for Player B, Chance to Hit for Player A, Chance to Hit for Player B. When a player performs a Dodge, the following data is preferably recorded: Energy of player, Turn Type, Balance for Player A, Balance for Player B, Chance to Hit for Player A, and Chance to Hit for Player B. When the Energy of either player becomes less than or equal to 0, the following data is recorded: Game Status (over).

Exemplary Embodiment No. 1

In a first exemplary embodiment, the game starts with the following initial session variables:
Game Status=In Play,
Player A Energy=1000,
Player B Energy=1000,
Player Turn=B,
Player A Balance=3,
Player B Balance=7,
Chance to Hit Player A=12%,
Chance to Hit Player B=28%
Operationally, the players take a plurality of turns to determine a winner. Exemplary set of initial turns include:
Turn One:
1. Player B performs Slash;
2. Hit Roll=23,
3. Slash Successful=Yes;
4. Player A Energy=950;
5. Player Turn=A
Turn Two:
1. Player A performs Adjust;
2. Player A Energy=930,
3. Player A Balance=6;
4. Player B Balance=5;
5. Chance to Hit Player A=24%;
6. Chance to Hit Player B=20%;
7. Player Turn=B
Turn Three
1. Player B performs Thrust;
2. Turn Type=Thrust,
3. Player Turn=A
Turn Four
1. Player A performs Riposte;
2. Riposte Successful=Yes;
3. Player B Energy=750;
4. Turn Type=Standard;
5. Player A Balance=4;
6. Player B Balance=8;
7. Chance to Hit Player A=16%;
8. Chance to Hit Player B=32%
Turn Five
1. Player A performs Slash;
2. Hit Roll=72;
3. Slash Successful=No;
4. Player Turn=B Exemplary Embodiment No. 2

In another exemplary embodiment, the game progresses under the following constraints:
Standard State Turn:
 If Balance is 1, 2, 3, or 4 the system generated move has a 25% chance to be Slash, 70% chance to be Adjust and 5% chance to be Thrust;
 if Balance is 5, 6, or 7 the system generated move has a 70% chance to be Slash, 20% chance to be Adjust and 10% chance to be Thrust;
 if Balance is 8, 9, or 10 the system generated move has a 65% chance to be Slash, 5% chance to be Adjust and 30% chance to be Thrust.
Response State Turn:
 If Balance is 1, 2, 3 or 4 the system generated move has a 10% chance to be Riposte and 90% chance to be Dodge;
 if Balance is 5, 6, or 7 the system generated move has a 30% chance to be Riposte and 70% chance to be Dodge;
 if Balance is 8, 9, or 10 the system generated move has a 80% chance to be Riposte and 20% chance to be Dodge.

Exemplary Embodiment No. 3

In another exemplary embodiment, the game progresses under the following constraints:
Standard State Turn:
 If Balance is 1, 2, or 3 the system generated move has a 28% chance to be Slash, 35% chance to be Feint, 35% chance to be Adjust and 2% chance to be Thrust;
 if Balance is 4, 5, 6, or 7 the system generated move has a 70% chance to be Slash, 20% chance to be Adjust and 10% chance to be Thrust;
 if Balance is 8, 9, or 10 the system generated move has a 65% chance to be Slash, 5% chance to be Adjust and 30% chance to be Thrust.
Thrust State Turn:
 If Balance is 1, 2, or 3 the system generated move has a 10% chance to be Riposte and 90% chance to be Dodge;
 if Balance is 4, 5, 6, or 7 the system generated move has a 30% chance to be Riposte and 70% chance to be Dodge;
 if Balance is 8, 9, or 10 the system generated move has a 90% chance to be Riposte and 10% chance to be Dodge.

Exemplary Embodiment No. 4

In another exemplary embodiment, the game is operated using the following plurality of exemplary instruction sets that define the game status, initial session data, and the progress of the game based on player moves:
Programmatic Instruction Set One: Set Up the Following Variables for Game Status
 Player Status 1=Energy
 Player Status 2=Balance
 Player Status 3=% to Hit (derived from Balance)
 Player Status 4=Hit Roll
 Game Status 1=Playing (yes or no)
 Game Status 2=Turn Type (Standard or Thrust)
Programmatic Instruction Set Two: Set the Following as Constants
 Starting Energy=1000
 Balance range=1-10
 Energy cost of Dodge=50
 Energy cost of Adjust=20
 Energy damage of successful Slash=50

Energy damage of successful Feint=50
Energy damage of successful Thrust or Riposte=250
Calculation for Slash % Hit based on Balance=4×Balance
Calculation for Feint % Hit based on Balance=5×ABS (Balance−10)
Delay before automove=15 seconds
Delay before re-covering up Opponent Balance=3 seconds Programmatic Instruction Set Three: The Play Screen Should have the Following Buttons
    Action 1=Slash
    Action 2=Feint
    Action 3=Adjust
    Action 4=Thrust
    Action 5=Riposte (hidden until active)
    Action 6=Dodge (hidden until active)

Programmatic Instruction Set Four: Set the Start Conditions when a Duel Starts
    Set Energy of Player A to 1000
    Set Energy of Player B to 1000
    Roll random number between 1 and 10 for Player A, save as Balance
        Set % to Hit for Slash=Balance*4
        Set % to Hit for Feint=ABS (Balance−10)*5
    Roll random number between 1 and 10 for Player B, save as Balance
        Set % to Hit for Slash=Balance*4
        Set % to Hit for Feint=ABS (Balance−10)*5
    Roll random number between 1 and 100
        If roll <51, set turn to Player A Standard
        If roll >50, set turn to Player B Standard
    Play animation #1 (players ready)

Programmatic Instruction Set Five: Set the End Conditions for a Duel End
    If Energy of either player <=0
        The other players wins
        Play an appropriate animation (e.g. player kneels)

Programmatic Instruction Set Six: When a Player Does a Slash
    Roll random number between 1 and 100
    Look at % Hit of attacker based on Balance
    If roll <=% Hit, then
        defender loses 50 energy
        play an appropriate animation (e.g. attacker slashes, defender gets hit)
    If roll >% Hit then
        play an appropriate animation (e.g. attacker slashes, defender parries)
    Change Turn to other player Standard Programmatic Instruction Set Seven: When a player does a Feint
    Roll random number between 1 and 100
    Look at % Hit of attacker based on Balance
    If roll <=% Hit, then
        defender loses 50 energy
        play an appropriate animation (e.g. attacker feints, defender gets hit)
    If roll >% Hit then
        play an appropriate animation (e.g. attacker feints, defender parries)
    Change Turn to other player Standard Programmatic Instruction Set Eight: When a Player Does an Adjust
    Roll random number between 1 and 10 for Player A, save as Balance (and set other variables accordingly)
    Roll random number between 1 and 10 for Player B, save as Balance (and set other variables accordingly)
    Play an appropriate animation (e.g. attacker adjusts position, defender adjusts position)
    Change Turn to other player Standard Programmatic Instruction Set Nine: When a Player Does a Thrust
    Play an appropriate animation (e.g. attacker prepares thrust, defender stands ready)
    Change Turn to other player Thrust Programmatic Instruction Set Ten: When a Player Does a Riposte
    Reveal opponent position (switch visibility of Balance Cover to off)
    Compare Balance of two players
        If one player has lower Balance than the other, that player loses 250 Energy
            Play an appropriate animation (e.g. player ripostes but fails and gets hit or player ripostes and hits opponent)
        If Balance of two players is equal, neither player loses Energy
            Play an appropriate animation (draw)
    After a predefined delay, hide opponent position (switch visibility of Balance Cover to on)
    Reroll Balance for both players
    Change Turn to same player Standard Programmatic Instruction Set Eleven: When a Player Does a Dodge
    Play an appropriate animation (e.g. player dodges the thrust)
    Player loses 50 Energy
    Reroll Balance for both players
    Change Turn to same player Standard Programmatic Instruction Set Twelve: Automove
    If either player fails to move within 15 seconds, the system will automove with the following:
        If turn is Standard, player will Slash
        If turn is Thrust, player will Dodge Programmatic Instruction Set Thirteen: In the Context of Playing Against a Computer, Set the Following Logic for the Trainer (Player Versus "Trainer")
    Same as two-player, but Trainer makes decisions as Opponent in the following way:
        All percentages are a random roll
        Trainer delay after Player moves and before moving=1 second
        If Standard Turn:
            If Balance is 1, 2, 3
                28% chance to Slash
                35% chance to Feint
                35% chance to Adjust
                2% chance to Thrust
            If Balance is 4, 5, 6, 7
                70% chance to Slash
                20% chance to Adjust
                10% chance to Thrust
            If Balance is 8, 9, 10
                65% chance to Slash
                5% chance to Feint
                30% chance to Thrust
        If Thrust Turn:
            If Balance is 1, 2, 3
                10% chance to Riposte
                90% chance to Dodge
            If Balance is 4, 5, 6, 7
                30% chance to Riposte
                70% chance to Dodge If Balance is 8, 9, 10
   90% chance to Riposte
   10% chance to Dodge In an embodiment of the present invention, the simulated combat game is implemented as a Flash based game having a 640×480 pixels screen resolution. In order to retain the integrity of the system during a game session, the Balance of an opponent player is not sent to a client until it is revealed. This eliminates the possibility of hacking into the game logic and obtaining an opponent player's balance, as the balance is not merely hidden by a user interface. Additionally, during a game session, a plurality of animations may be presented to players at different stages of the game in order to enhance the visual appeal of the game. In an exemplary embodiment, the following animations may be presented to a first player 'A' and a second player 'B':

1. An animation depicting player A standing idle with no opponent is presented when the player has logged in but has not been assigned an opponent;
2. An animation depicting both players A and B standing ready and swaying slightly is presented when the two players are ready to being a game session;
3. An animation depicting player A shifting on his foot position, and after a predefined interval of time, player B shifts his position is presented when an Adjust move is played by player A;
4. An animation depicting player B shifting his foot position, and after a predefined interval of time, player A shifting his position is presented when an Adjust move is played by player B;
5. An animation depicting player A slashing with sword, and player B parrying the blow is presented when the player A makes a Slash move and player B is not hit;
6. An animation depicting player A slashing with sword, and player B getting hit is presented when the player A makes a Slash move and player B is hit;
7. An animation depicting player B slashing with sword, and player A parrying the blow is presented when the player B makes a Slash move and player A is not hit;
8. An animation depicting player B slashing with sword, and player A getting hit is presented when the player B makes a Slash move and player A is hit;
9. An animation depicting player A preparing to thrust, and player B standing ready is presented when the player A plays a Thrust move;
10. An animation depicting player B preparing to thrust, and player A standing ready is presented when the player B plays a Thrust move;
11. An animation depicting player A thrusting, and player B dodging out of the way is presented when the player A plays a Thrust move and the player B plays a Dodge move;
12. An animation depicting player B thrusting, and player A dodging out of the way is presented when the player B plays a Thrust move and the player A plays a Dodge move;
13. An animation depicting player A thrusting, and player B getting hit is presented when the player A plays a Thrust move and the player B is hit by playing a Riposte move;
14. An animation depicting player B thrusting, and player A getting hit is presented when the player B plays a Thrust move and the player A is hit by playing a Riposte move;
15. An animation depicting player B riposting the thrust and hitting player A is presented when player B makes a riposte move in response to a Thrust move made by player A which results in Energy of player A being reduced;
16. An animation depicting player A riposting the thrust and hitting player B is presented when player A makes a riposte move in response to a Thrust move made by player B which results in Energy of player B being reduced;
17. An animation depicting player B falling to knees exhausted, and player A standing idle is presented when Energy of player B<=0;
18. An animation depicting player A falling to knees exhausted, and player B standing idle is presented when Energy of player A<=0; and
19. An animation depicting player A and B meeting swords in the middle is presented when after a Riposte move it is revealed that Energy of player A and player B is equal.

Hence, the present invention provides a method of simulated combat that uses a hidden random status for each player that is revealed at a certain point to determine the recipient of a benefit by comparing the status of each player. While hidden, the status has an additional visible impact on game play, giving players an opportunity to guess the likelihood that an opponent holds a particular status.

While the exemplary embodiments of the present invention are described and illustrated herein, it will be appreciated that they are merely illustrative. It will be understood by those skilled in the art that various changes in form and detail may be made therein without departing from or offending the spirit and scope of the invention.

What is claimed is:

1. A computer product comprising a first plurality of programmatic instructions stored in non-transitory storage media and a second plurality of programmatic instructions stored in non-transitory storage media wherein said first plurality of programmatic instructions is made network accessible for downloading onto a client device, wherein, when executed by processors, at least one of said first plurality of programmatic instructions or said second plurality of programmatic instructions cause:
   a first hidden value to be assigned to a first player and a second hidden value to be assigned to a second player;
   a first disclosed value to be assigned to a first player and a second disclosed value to be assigned to a second player;
   a first turn to be taken by the first player wherein said first turn comprises:
      a. a first action to be taken, as represented by at least one animation, in response to an input from the first player; and
      b. a first outcome to be determined, wherein the first outcome is determined by doing at least one of the following:
         i. applying a function of each of said first and second hidden values, wherein at least one of the first or second disclosed values is modified to create modified first or second disclosed values;
         ii. replacing the first hidden value and the second hidden value with a first new hidden value and a second new hidden values, wherein at least one of the first or second disclosed values is modified based upon said replacement to create modified first or second disclosed values; and
         iii. revealing said first and second hidden values and, based on a comparison of said first and second hidden values, modifying at least one of the first or second disclosed values to create modified first or second disclosed values;

a second turn to be taken by the second player wherein said second turn comprises:
  a. a second action to be taken, as represented by at least one animation, in response to an input from the second player; and
  b. a second outcome to be determined, wherein the second outcome is determined by doing at least one of the following:
    i. applying a function of each of said first and second hidden values wherein at least one of the first or second disclosed values is modified to create modified first or second disclosed values;
    ii. replacing the first hidden value and the second hidden value with new hidden values, wherein at least one of the first or second disclosed values is modified based upon said replacement; and
    iii. revealing said first and second hidden values and, based on a comparison of said first and second hidden values, modifying at least one of the first or second disclosed values;
  wherein the first player has a first hit rate and the second player has a second hit rate, wherein the first hit rate is related to the first hidden value, wherein the second hit rate is related to the second hidden value, wherein the first hit rate is not determinative of the first action taken by the first player and wherein the second hit rate is not determinative of the second action taken by the second player.

2. The computer product as claimed in claim 1 wherein the first and second hidden values are randomly generated numbers having values within a predefined range and wherein the first and second hidden values remain hidden from each player.

3. The computer product as claimed in claim 1 wherein, upon revealing said hidden values and comparing said hidden values, it is determined that the first hidden value is less than the second hidden value.

4. The computer product of claim 3 wherein, upon determining that the first hidden value is less than the second hidden value, the first disclosed value is decreased by a factor.

5. The computer product as claimed in claim 1 wherein, upon revealing said hidden values and comparing said hidden values, it is determined that the second hidden value is less than the first hidden value.

6. The computer product of claim 5 wherein, upon determining that the second hidden value is less than the first hidden value, the second disclosed value is decreased by a factor.

7. The computer product of claim 1 wherein said first outcome is determined by generating a random number, applying a function to said first hidden value and said random number to yield a first value and comparing said first value to a second value.

8. The computer product of claim 7 wherein if the first value is greater than the second value, the second disclosed value is decreased by an amount.

9. The computer product of claim 7 wherein if the first value is less than the second value, the first disclosed value is decreased by an amount.

10. A method executed by a processor operating on at least one of a first plurality of programmatic instructions stored in non-transitory storage media wherein said first plurality of programmatic instructions is made network accessible for downloading onto a client device, said method comprising the steps of:
  assigning a first hidden value to a first player and a second hidden value to a second player;
  assigning a first disclosed value to a first player and a second disclosed value to a second player;
  determining a first hit rate of the first player based on the first hidden value and a second hit rate of the second player based on the second hidden value;
  taking a first action, as represented by at least one animation, in response to an input from the first player, wherein the first action is not limited by the first hidden value;
  determining a first outcome, wherein the first outcome is determined by doing at least one of the following:
    i. applying a function of each of said first and second hidden values wherein at least one of the first or second disclosed values is modified to create modified first or second disclosed values;
    ii. replacing the first hidden value and the second hidden value with a first new hidden values and a second new hidden value, wherein at least one of the first or second disclosed values is modified based upon said replacement to create modified first or second disclosed values; and
    iii. revealing said first and second hidden values and, based on a comparison of said first and second hidden values, modifying at least one of the first or second disclosed values to create modified first or second disclosed values;
  taking a second action, as represented by at least one animation, in response to an input from the second player, wherein the second action is not limited by the second hidden value; and
  determining a second outcome, wherein the second outcome is determined by doing at least one of the following:
    i. applying a function of each of said first and second hidden values, wherein at least one of the first or second disclosed values is modified to create modified first or second disclosed values;
    ii. replacing the first hidden value and the second hidden value with new hidden values, wherein at least one of the first or second disclosed values is modified based upon said replacement; and
    iii. revealing said first and second hidden values and, based on a comparison of said first and second hidden values, modifying at least one of the first or second disclosed values.

11. The method of claim 10 wherein said first outcome is determined by generating a random number, applying a function to said first hidden value and said random number to yield a first value and comparing said first value to a second value.

12. The method of claim 11 wherein if the first value is greater than the second value, the second disclosed value is decreased by an amount.

13. The method of claim 11 wherein if the first value is less than the second value, the first disclosed value is decreased by an amount.

* * * * *